United States Patent
Mohamadi

(10) Patent No.: US 7,610,064 B2
(45) Date of Patent: Oct. 27, 2009

(54) DIRECT DOWNLINK RF MODULE

(76) Inventor: Farrokh Mohamadi, 8 Halley, Irvine, CA (US) 92612-3797

( * ) Notice: Subject to any disclaimer, the term of this patent is extended or adjusted under 35 U.S.C. 154(b) by 639 days.

(21) Appl. No.: 10/942,383

(22) Filed: Sep. 16, 2004

(65) Prior Publication Data

US 2005/0057421 A1    Mar. 17, 2005

Related U.S. Application Data

(60) Provisional application No. 60/503,593, filed on Sep. 16, 2003.

(51) Int. Cl.
H04B 1/38    (2006.01)

(52) U.S. Cl. .................. 455/561; 455/562.1; 343/853; 343/893; 342/350; 342/354; 342/368

(58) Field of Classification Search ............... 455/11.1, 455/13.1, 15, 25, 63.4, 101, 226.1, 226.2, 455/561, 562.1, 132, 404.1, 456.1, 456.5; 375/267, 144, 147, 148, 299, 316, 347, 377; 343/702, 843, 893; 370/208; 342/350, 354, 342/357.06, 357.12, 368

See application file for complete search history.

(56) References Cited

U.S. PATENT DOCUMENTS

| | | | | |
|---|---|---|---|---|
| 6,282,247 | B1* | 8/2001 | Shen | 375/285 |
| 6,348,891 | B1* | 2/2002 | Uemura | 342/413 |
| 6,744,403 | B2* | 6/2004 | Milnes et al. | 342/357.07 |
| 7,013,165 | B2* | 3/2006 | Yoon et al. | 455/561 |
| 7,091,861 | B2* | 8/2006 | Schmidtberg et al. | 340/572.1 |
| 7,099,697 | B2* | 8/2006 | Okawa et al. | 455/562.1 |
| 7,250,903 | B1* | 7/2007 | McDowell | 342/357.02 |
| 7,260,115 | B1* | 8/2007 | DeFord | 370/475 |
| 7,260,424 | B2* | 8/2007 | Schmidt | 455/575.7 |
| 7,398,094 | B2* | 7/2008 | Forrester | 455/456.5 |
| 2004/0100920 | A1* | 5/2004 | Ball et al. | 370/318 |
| 2007/0285312 | A1* | 12/2007 | Gao et al. | 342/367 |

OTHER PUBLICATIONS

M. Fisk et al. "1550nm Long Distance CWDM Transceivers", IEEE 802.3ae, Ottawa, May 2000.

Goddard Space Flight Center, NASA, Ka-Band Transition Product (KaTP) System Requirements Document (450-SRD), Mar. 2002.

Yen Wong, "Status of NASA/GSFC Ka-Band Activities Including High Data Rate . . . ", NASA Publication 2002, pp. 1-8.

Yen Wong, "NASA/GSFC Ground Segment Upgrades for Ka-Band Support to Near-Earth Spacecraft", NASA Publication 2002, pp. 1-10.

F. Mohamadi, "A 10 Gbps (4×3.125 GBd) Transceiver", IEEE 802.3ae, Ottawa, May 2000.

B. Wiedemann, "Evaluating 10 GBASE-SX CWDM", IEEE 802.3ae, Ottawa, May 2000.

(Continued)

*Primary Examiner*—Charles N Appiah
*Assistant Examiner*—Anthony S Addy
(74) *Attorney, Agent, or Firm*—Haynes & Boone, LLP.

(57) ABSTRACT

A downlink module is provided that includes a sensor interface operable to provide digital sensor signals. It also includes a GPS receiver for receiving GPS timing and location signals. The downlink module may be configured to form packets of digital sensor signals and GPS timing and location signals according to a desired protocol.

8 Claims, 8 Drawing Sheets

OTHER PUBLICATIONS

H. Suzuki et al., "PHY OAM Baseline Proposal", IEEE 802.3ah EFM Task Force, Atlanta, Jul. 2002.

R.A. Bauer et al., "Space Communications and Data Systems Technologies for Next Generation Earth . . . ", NASA GRC Report.

B. Younes et al., "NASA Future Operations At Ka-Band For Leo Spacecraft Support", NASA Publication.

"Scope of PHY OAM", IEEE 802.3ah EFM Task Force, Jul. 2002.

D. Zillig et al., "New TDRSS Communications Options for Small Satellites", NASA Publication.

M. Grahne et al., "Inflatable Solar Arrays: Revolutionary Technology", Society of Automotive Engineers, 1999, pp. 1-8.

R. Bauer et al., "Space Communications and Data Systems Technologies for Next Generation Earth Science Measurements", Oct. 2003.

* cited by examiner

BCH = Broadcast Control Channel
CS = Circuit Switch
PBCH = Packet Broadcast Control Channel
PDCH = Packet Data Channel

DIRECT DOWNLINK RF MODULE

RELATED APPLICATIONS

This application claims the benefit of U.S. Provisional Application No. 60/503,593, filed Sep. 16, 2003.

TECHNICAL FIELD

The present invention relates generally to remote sensing, and more particularly to an RF downlink module.

BACKGROUND

Conventional high-frequency antennas are often cumbersome to manufacture. For example, antennas designed for 100 GHz bandwidths typically use machined waveguides as feed structures, requiring expensive micro-machining and hand-tuning. Not only are these structures difficult and expensive to manufacture, they are also incompatible with integration to standard semiconductor processes.

As is the case with individual conventional high-frequency antennas, beam-forming arrays of such antennas are also generally difficult and expensive to manufacture. Conventional beam-forming arrays require complicated feed structures and phase-shifters that are impractical to be implemented in a semiconductor-based design due to its cost, power consumption and deficiency in electrical characteristics such as insertion loss and quantization noise levels. In addition, conventional beam-forming arrays become incompatible with digital signal processing techniques as the operating frequency is increased. For example, at the higher data rates enabled by high frequency operation, multipath fading and cross-interference becomes a serious issue. Adaptive beam forming techniques are known to combat these problems. But adaptive beam forming for transmission at 10 GHz or higher frequencies requires massively parallel utilization of A/D and D/A converters.

The need for overhead intelligence, surveillance, and reconnaissance is growing in both civilian and military applications. A wireless remote sensor having beam forming capabilities integrated on a semiconductor substrate would enable affordable detection, identification, and tracking of objects in urban and foliated areas. Accordingly, there is a need in the art for a semiconductor-based remote wireless sensor

SUMMARY

In accordance with one aspect of the invention, a downlink module is provided that includes: a sensor interface operable to provide digitized sensor signals; a GPS receiver operable to provide GPS timing and location signals; a digital signal processor and coding modulator for forming baseband packets of the digitized sensor signals and the GPS timing and location signals according to a desired protocol; an IF stage for converting the baseband packets into an RF packet signal; a beamforming controller; and an array of integrated antenna circuits, each integrated antenna circuit including an antenna operable to phase shift and/or attenuate the RF packet signal according to a beamforming command from the beamforming controller such that a transmitted RF packet signal from the array of integrated antenna circuit is directed into a desired beam direction.

In accordance with another aspect of the invention, a directional RF repeater is provided that includes: a beamforming controller; a first array of integrated antenna circuits, each integrated antenna circuit including an antenna operable to phase shift and/or attenuate a received RF signal according to a beamforming command from the beamforming controller such that the received RF signal is received in a first desired beam direction; a RF combiner for combining the received RF signals from the first array of integrated antenna circuits into a combined RF signal; and a second array of integrated antenna circuits, each integrated antenna circuit in the second array including an antenna operable to phase shift and/or attenuate the combined RF signal according to a beamforming command from the beamforming controller such that the combined RF signal is transmitted in a second desired beam direction.

In accordance with another aspect of the invention, an integrated antenna array is provided that includes: a semiconductor wafer having a first surface and an opposing second surface; heavily-doped contact regions extending from the first surface to the second surface; a metallic layer on the second surface; an insulating layer on the metallic layer; a first periodic array of T-shaped dipole antenna elements formed on the insulating layer; wherein each arm of each T-shaped dipole has a first segment and a second segment coupled at an offset angle to the first segment; and electrical conductors formed in vias in the insulating layer, the electrical conductors coupling the antenna elements through the contact regions to driving circuitry formed on the first surface of the substrate, the separation between the driving circuitry and the T-shaped antenna elements thereby aiding electrical isolation of the driving circuitry.

In accordance with another aspect of the invention, an integrated array is provided that includes: a substrate; a linear array of loop dipole elements arranged on a surface of the substrate; and driving circuitry for phasing the linear array such that conical beamshaping is achieved.

The invention will be more fully understood upon consideration of the following detailed description, taken together with the accompanying drawings.

BRIEF DESCRIPTION OF THE DRAWINGS

FIG. 2b is a schematic illustration of an RF beamforming interface circuit for an integrated antenna circuit within the RF beamforming and controller unit of FIG. 2a.

DETAILED DESCRIPTION

Figure 1:
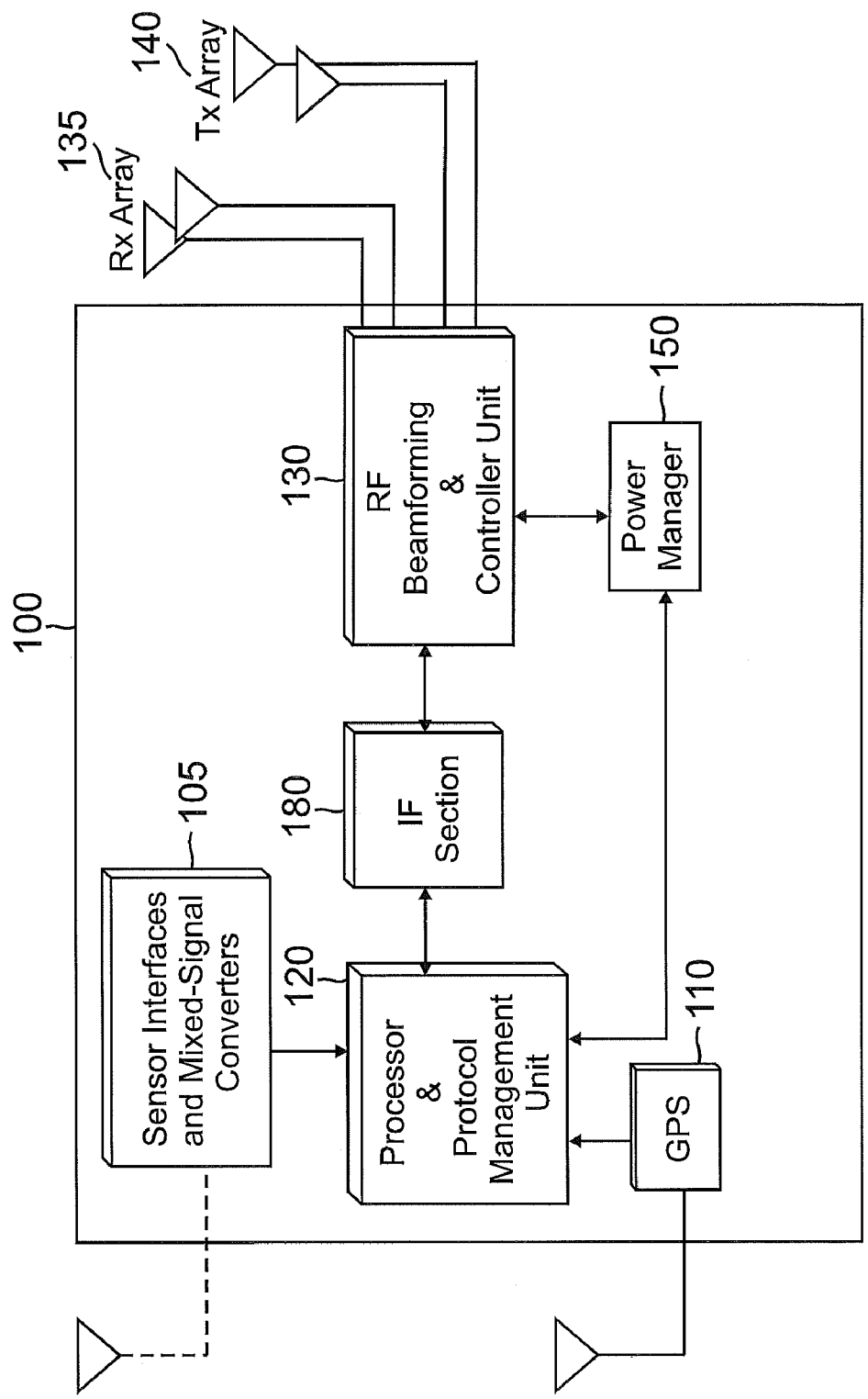
FIG. 1 is a block diagram of an RF downlink module according to one embodiment of the invention.

The present invention provides an RF downlink module having beam forming capabilities integrated onto a semiconductor substrate. This RF downlink module utilizes and expands upon the beam forming capabilities described in copending U.S. Ser. No. 10/423,303, filed Apr. 25, 2003, Ser. No. 10/423,106, filed Apr. 25, 2003, Ser. No. 10/422,907, filed Apr. 25, 2003, Ser. No. 10/423,129, filed Apr. 25, 2003, and Ser. No. 10/860,526, filed Jun. 3, 2004, the contents of all of which are hereby incorporated by reference in their entirety. A block diagram for an exemplary embodiment of an RF downlink module 100 is shown in FIG. 1. RF downlink module 100 includes sensor interfaces and analog-to-digital converters circuit 105. In general, RF downlink module 100 may be used to downlink information from any desired sensor, such as a thermal sensor, an electromagnetic sensor, an electrochemical sensor, or any other type of sensor that can sense energy or some sort and convert the sensed energy into analog or digital electrical signals. Should the resulting electrical signals from the sensor(s) be in analog form, sensor interfaces and analog-to-digital converter circuit digitizes the analog electrical signals. RF downlink module 100 receives global positioning system (GPS) information from a GPS receiver 110.

RF downlink module 100 includes a digital signal processor and protocol management circuit 120 that integrates the digitized sensor signals with the GPS information into a packet according to a conventional communication protocol such as 802.11 or GPRS. After packetizing the digitized sensor information with GPS timing and location information, RF downlink module 100 downlinks the packets to a desired recipient. Although beam forming may be performed in the IF as described, for example, in U.S. Ser. No. 10/423,106, beam forming may also be performed in the RF using an RF beamforming and controller unit 130 which includes a receive antenna array 135 and a transmit antenna array 140. By keeping the necessary phase-shifting in the RF, a much simpler design is achieved. It will be appreciated, however, that separate receive and transmit antennas may also be implemented within each integrated antenna circuit 125. RF beamforming and controller unit 130 interfaces with a power management circuit 150 as described herein. An IF stage 180 is operable to provide RF-to-IF conversion and IF-to-baseband conversion on the received signals. The resulting baseband signal is then provided to digital signal processor and coding modulator 120. In addition, IF stage 180 may also receive a baseband signal from digital signal processor and coding modulator 120 and is operable to provide a baseband-to-IF and IF-to-RF conversion on this baseband signal. It will be appreciated, however, that a homodyne rather than a superheterodyne architecture may also be implemented within RF downlink module 100.

Figure 2A:
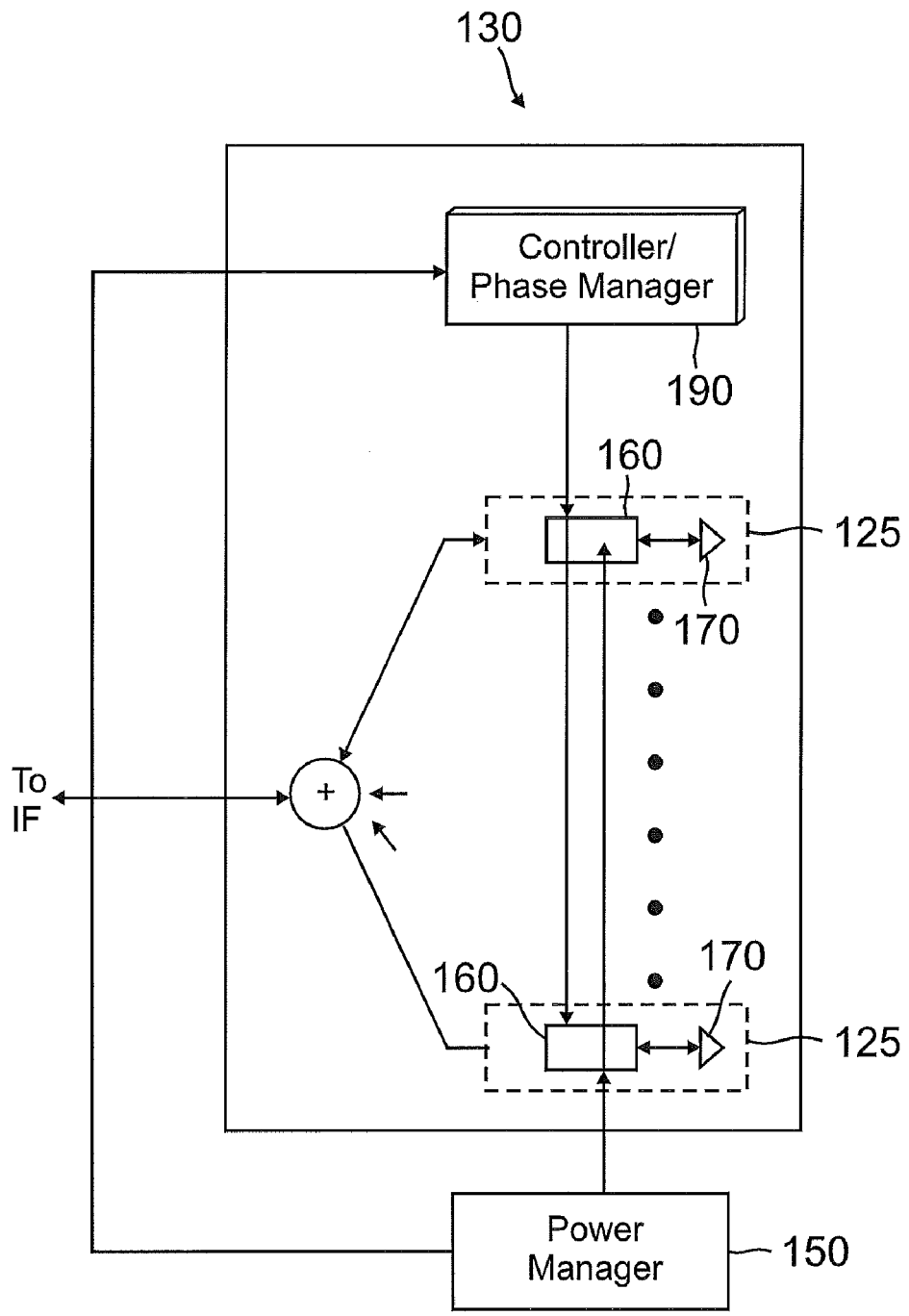
FIG. 2a is a block diagram for the RF beamforming and controller unit of FIG. 1.
Figure 2B:
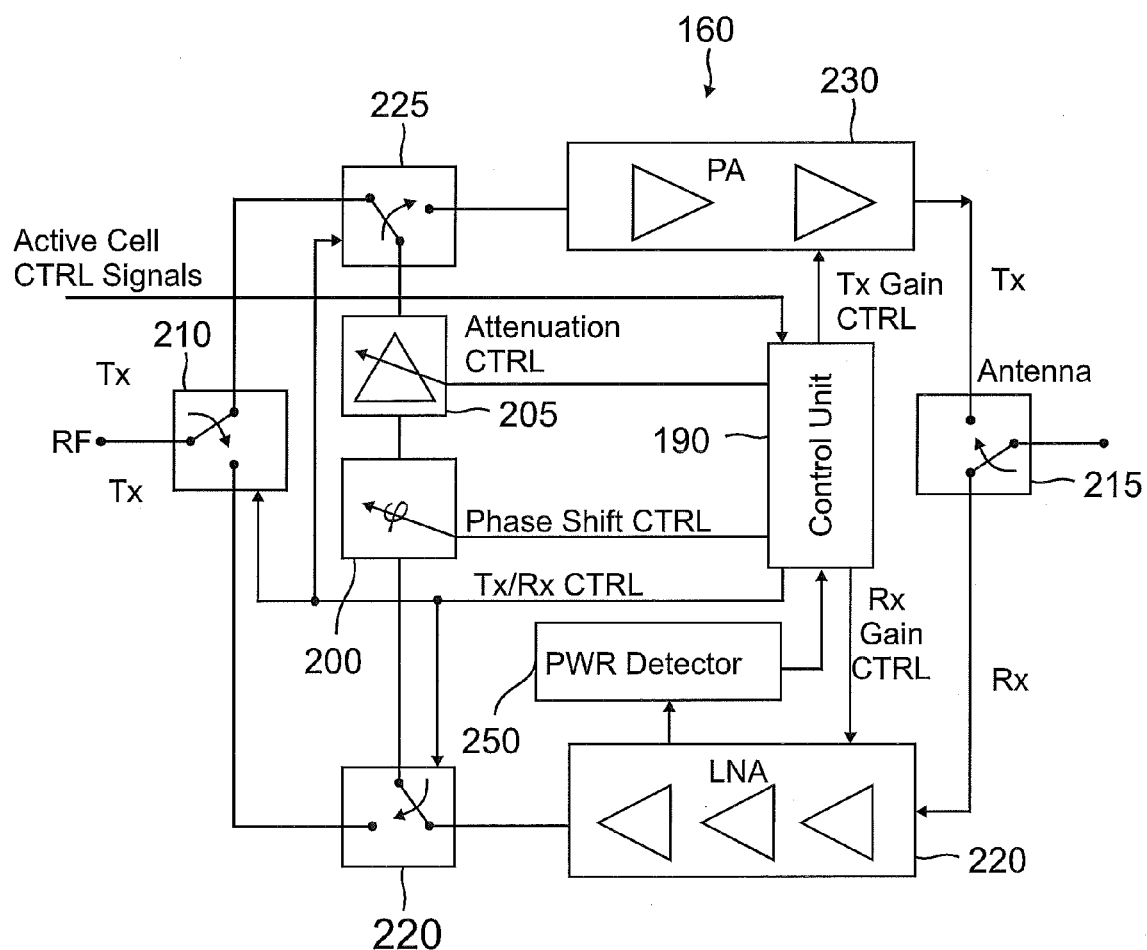

Turning now to FIG. 2a, an exemplary embodiment of RF beamforming and controller unit 130 is illustrated. In this embodiment, the receive and transmit antenna arrays are the same such that each antenna 170 functions to both transmit and receive. A plurality of integrated antenna circuits 125 each includes an RF beamforming interface circuit 160 and a receive/transmit antenna 170. RF beamforming interface circuit 160 adjusts the phase and/or the amplitude of the received and transmitted RF signal responsive to control from a controller/phase manager circuit 190. A circuit diagram for an exemplary embodiment of RF beamforming interface circuit 160 is shown in FIG. 2b. Note that the beamforming performed by beamforming circuits 160 may be performed using either phase shifting, amplitude shifting, or a combination of both phase shifting and amplitude shifting. Accordingly, RF beamforming interface circuit 160 is shown including both a variable phase shifter 200 and a variable attenuator 205. It will be appreciated, however, that the inclusion of either phase shifter 200 or attenuator 205 will depend upon the type of beamforming being performed. To provide a compact design, RF beamforming circuit may include RF switches/multiplexers 210, 215, 220, and 225 so that phase shifter 200 and attenuator 205 may be used in either a receive or transmit configuration. For example, in a receive configuration RF switch 215 routes the received RF signal to a low noise amplifier 220. The resulting amplified signal is then routed by switch 220 to phase shifter 200 and/or attenuator 205. The resulting shifted signal routes through RF switch 225 to RF switch 210. RF switch 210 then routes the signal to IF stage 180 (FIG. 1).

In a transmit configuration, the RF signal received from IF stage 180 routes through RF switch 210 to RF switch 220, which in turn routes the RF signal to phase shifter 200 and/or attenuator 205. The resulting shifted signal is then routed through RF switch 225 to a power amplifier 230. The amplified RF signal then routes through RF switch 215 to antenna 170 (FIG. 1). It will be appreciated, however, that different configurations of switches may be implemented to provide this use of a single set of phase-shifter 200 and/or attenuator 205 in both the receive and transmit configuration. Furthermore, RF beamforming interface circuit 160 may also be implemented with the use of separate phase-shifters and/or attenuators for the receive and transmit paths.

To provide the beamforming capability, a power detector 250 functions as a received signal strength indicator to measure the power in the received RF signal. For example, power detector 250 may comprise a calibrated envelope detector. Power manager 150 may detect the peak power determined by the various power detectors 250 (FIG. 2) within each integrated antenna circuit 125. The integrated antenna circuit 125 having the peak detected power may be denoted as the "master" integrated antenna circuit. Power manager 150 may then determine the relative delays for the envelopes for the RF signals from the remaining integrated antenna circuits 125 with respect to the envelope for the master integrated antenna circuit 125. To transmit in the same direction as this received RF signal, controller/phase manager 190 may determine the phases corresponding to these detected delays and command the transmitted phase shifts/attenuations accordingly. Alternatively, a desired receive or transmit beamforming direction may simply be commanded by controller/phase manager 190 rather than derived from a received signal.

It will be appreciated that integrated antenna circuits 125 may be replaced by an array of integrated oscillator/antenna units, wherein each integrated oscillator/antenna unit includes a phase-locked loop (PLL) and a corresponding antenna and mixer as discussed, for example, in U.S. Ser. No. 10/860,526 (the '526 application). In such an embodiment, each PLL is operable to receive a reference signal and provide a frequency-shifted signal output signal that is synchronous with the reference signal. Should an integrated oscillator/antenna unit be configured for transmission, its output signal is upconverted in the unit's mixer and the upconverted signal transmitted by the corresponding antenna. Alternatively, should an integrated oscillator/antenna unit be configured for reception, a received RF signal from the unit's antenna is downconverted in the mixer responsive to the frequency-shifted output signal from the PLL. As further described in the '526 application, the beamforming provided by an array of integrated oscillator/antenna units may be programmably controlled by a phase sequencer that controls the reference clocks provided to a "slave" subset of the integrated oscillator/antenna units. A "master" integrated oscillator/antenna unit receives a reference clock as its reference signal such that the reference clocks provided to the slave subset are phase-shifted versions of the reference clock. Although the programmable phase shifting described in the '526 application may be utilized in the present invention, the resulting beamforming is performed in the mixer block rather than in the RF domain. By performing the beamforming directly in the RF domain as discussed with respect to FIGS. 1 and 2, substantial savings are introduced. Thus, the following discussion will assume that the beamforming is performed in the RF domain.

Each antenna 170 within the integrated antenna circuits 125 may be formed using conventional CMOS or SiGe processes as discussed in U.S. Ser. No. 10/423,106 (the '160 application) for patch and dipole configurations. For example, as seen in cross section in FIG. 3, antenna 170 may be configured as a T-shaped dipole antenna 300. T-shaped antenna 300 is excited using vias 310 that extend through insulating layers 305 and through a ground plane 320 to driving transistors formed on a switching layer 330 separated from a substrate 350 by an insulating layer 305. Two T-shaped antenna elements 300 may be excited by switching layer 330 to form a dipole pair 360. To provide polarization diversity, two dipole pairs 360 may be arranged such that the transverse arms in a given dipole pair are orthogonally arranged with respect to the transverse arms in the remaining dipole pair.

Depending upon the desired operating frequencies, each T-shaped antenna element 300 may have multiple transverse arms. The length of each transverse arm is approximately one-fourth of the wavelength for the desired operating frequency. For example, a 2.5 GHz signal has a quarter wavelength of approximately 30 mm, a 10 GHz signal has a quarter wavelength of approximately 6.75 mm, and a 40 GHz signal has a free-space quarter wavelength of 1.675 mm. Thus, a T-shaped antenna element 300 configured for operation at these frequencies would have three transverse arms having fractions of lengths of approximately 30 mm, 6.75 mm and 1.675 mm, respectively. The longitudinal arm of each T-shaped element may be varied in length from 0.01 to 0.99 of the operating frequency wavelength depending upon the desired performance of the resulting antenna. For example, for an operating frequency of 105 GHz, a longitudinal arm may be 500 micrometers in length and a transverse arm may be 900 micrometers in length using a standard semiconductor process. In addition, the length of each longitudinal arm within a dipole pair may be varied with respect to each other. The width of longitudinal arm may be tapered across its length to lower the input impedance. For example, it may range from 10 micrometers in width at the via end to hundreds of micrometers at the opposite end. The resulting input impedance reduction may range from 800 ohms to less than 50 ohms.

Each metal layer forming T-shaped antenna element 300 may be copper, aluminum, gold, or other suitable metal. To suppress surface waves and block the radiation vertically, insulating layer 305 between the T-shaped antenna elements 300 within a dipole pair may have a relatively low dielectric constant such as $\in=3.9$ for silicon dioxide. The dielectric constant of the insulating material forming the remainder of the layer holding the lower T-shaped antenna element 300 may be relatively high such as $\in=7.1$ for silicon nitride, $\in=11.5$ for $Ta_2O_3$, or $\in=11.7$ for silicon. Similarly, the dielectric constant for the insulating layer 305 above ground plane 520 may also be relatively high (such as $\in=3.9$ for silicon dioxide, $\in=11.7$ for silicon, $\in=11.5$ for $Ta_2O_3$).

The quarter wavelength discussion with respect to the T-shaped dipole antenna 300 may be generally applied to other antenna topologies such as patch antennas. However, note that it is only at relatively high frequencies such as the upper bands within the W band of frequencies that the quarter wavelength of a carrier signal in free space is comparable or less than the thickness of substrate 350. Accordingly, at lower frequencies, integrated antennas should be elevated away from the substrate by using an interim passivation layer. Moreover, although the antenna design shown in FIG. 3 may be advantageously integrated with the remaining components of RF downlink module 100 on just a single semiconductor substrate, these remaining components are formed on a substrate surface that faces the antennas. As the number of antennas within the array is increased, the coupling of signals to the antenna's driving circuitry becomes cumbersome, particularly for a wafer-scale design. Accordingly, an antenna topology as disclosed in U.S. Ser. No. 10/891,352, entitled Beacon-On-Demand Radar Transponder, filed Jul. 14, 2004, the contents as which are hereby incorporated by reference in their entirety, wherein the antennas are formed on a first side of the semiconductor substrate may be implemented. The remaining components of transponder 100 may then be integrated onto the opposing second side of the semiconductor substrate. For example, consider the antenna elements 400 shown in FIG. 4. Each element 400 is the arm of a T-shaped dipole antenna. To allow the formation of active circuitry on one side of a substrate 405 and antenna arms 400 on the opposing side of substrate 405, heavily doped (which may be either n+ or p+ depending upon design considerations) contact areas 410 are diffused through substrate 405 to serve as feed structures for antennas 400. Active circuitry 415 comprising the remainder of RF downlink module 100 may then be formed on a surface 411 of substrate 405. Active circuitry 415 may next be insulated through the deposition of a passivation/insulating layer 420 on surface 411. For example, layer 520 may comprise a low temperature porous SiOx layer and a thin layer of Nitride (SixOyNz) such that passivation layer 420 is a fraction to a few microns in thickness. Passivation layer 420 may then be coated with a thermally conductive material 425 and taped to a plastic adhesive holder so that substrate 405 may be flipped to expose as yet-unprocessed side 430 of substrate/wafer 405.

Figure 3:
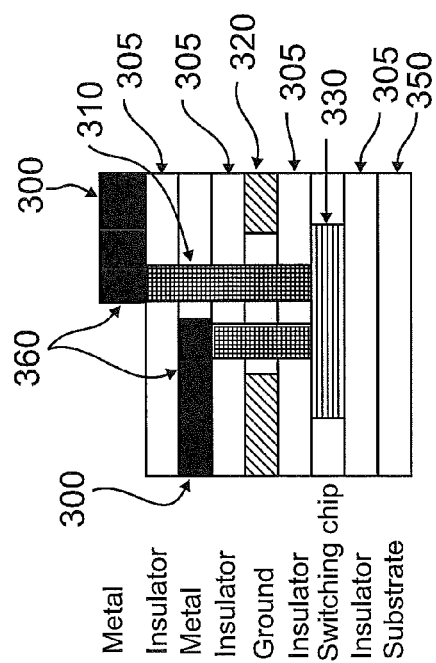
FIG. 3 is a cross-sectional view of a T-shaped dipole that may be implemented within the integrated antenna circuits of FIG. 1.

To ensure that contact areas 410 electrically couple through substrate 405, side 430 of substrate 405 may be back-ground such that substrate 405 has a thickness of a few hundred micrometers. A shielding metallization layer 440 may then be sputtered or alternatively coated using conductive paints onto surface 430. Layer 440 acts as an electric shield and a reflective plane between antennas 400 and active circuitry 415. To assist electrical coupling, metal layer 440 may be patterned to form metal lumps on top of contacts 410. A layer 450 of porous low dielectric material or honeycomb structure may then be deposited or placed onto metal layer 440, respectively. Layer 450 may also be formed of flexible material for conformal designs. Target alignment patterns that were etched during conventional manufacturing of the substrate 405 may then be used to guide the location of vias 455, which may be bored using micro-machining techniques through layer 450. Alternatively, a conventional infra-red alignment scheme of prior art may be used to locate vias 455. Precision rods 460 are then inserted through vias 455 to allow electrical coupling to antennas 400. Alternatively, a conductive material may be deposited into vias 455. Advantageously, the formation of metal bumps as described previously in metal layer 440 eases the formation of ohmic contacts between contacts 410 and rods 460. Without these bumps, inserting rods into metal layer 440 would involve an increased risk of cracking substrate 405. Antennas 400 may then be formed and protected by a passivation layer 475, which also provides impedance matching to the outside environment. It will be appreciated that any suitable topology may be used for antennas 400 such as a T-shaped dipoles or patch configuration. Moreover, the contacts 405 may be formed from the back side 430 of substrate 405 such that active circuitry could cover overlay the heavily-doped contact areas. In such an embodiment, the contact areas need not extend all the way through the substrate but just reach to the level where the active circuitry is formed. Regardless of how the contact areas are formed, it will be appreciated that electrical isolation between the active circuitry and the antenna elements is enhanced by such a design. Moreover, such a design allows the application of thermally conductive material 425 on the same side of the substrate where the active circuitry is formed. Should the active circuitry be formed on the same side of the substrate in common with the antenna elements as seen in FIG. 3, access is cumbersome and a thermally conductive material would have to be placed on the opposite side of the substrate, thereby reducing its effectiveness.

Figure 4:
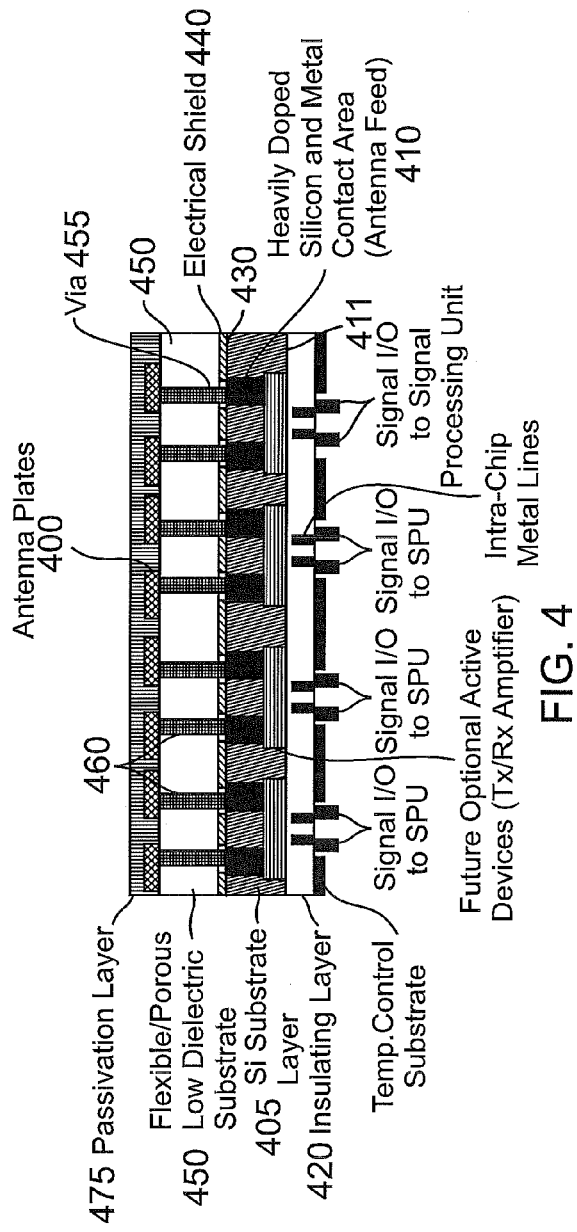
FIG. 4 is a cross-sectional view of antenna elements that may be implemented within the integrated antenna circuits of FIG. 1 configured for greater connectivity properties in accordance with an aspect of the invention.
Figure 5:
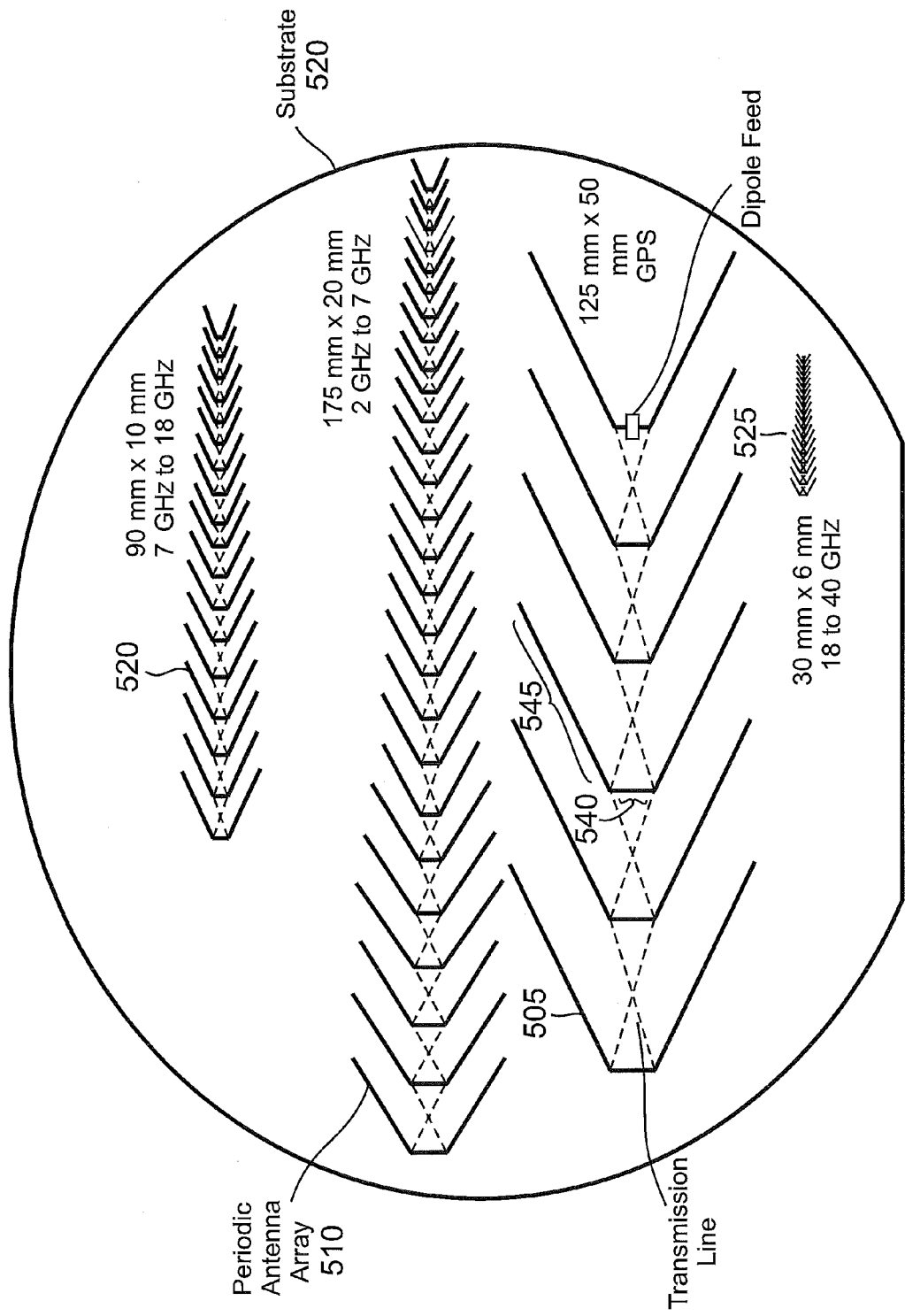
FIG. 5 is a plan view of multiple arrays of periodic T-shaped dipole arrays integrated onto a semiconductor wafer according to an embodiment of the invention.

As seen in FIG. 4, antenna elements 400 may be configured for operation in various frequency bands such as a GPS band, 2-7 GHz, 7-18 GHz, and 18-40 GHz. Advantageously, periodic arrays of T-shaped dipoles may be arranged on a single 6 inch or 8 inch semiconductor wafer to achieve operation across these bands. For example, turning now to FIG. 5, a semiconductor wafer 500 is shown having four periodic arrays of T-shaped dipoles. A first array 505 is adapted for operation in the GPS frequency band. A second array 510 is adapted for operation in the 2-7 GHz band. A third array 520 is adapted for operation in the 7-18 GHz band. Finally, a fourth array 525 is adapted for operation in the 18-40 GHz band. Those of ordinary skill will appreciate that four arrays of conventional T-shaped dipoles adapted for operation in these frequency bands could not all be integrated onto a single semiconductor wafer 500 in this fashion in that even an 8 inch wafer would not be large enough to accommodate all the arrays. Thus, the inventive periodic arrays 505 through 525 comprise T-shaped dipole elements wherein each T-shaped dipole arm includes a first portion 540 and a swept-back portion 545 aligned at approximately 45 to 60 degrees with respect to first portion 540. The ratio of the relative lengths for first portion 540 and swept-back portions 545 is approximately 0.05. As is known for periodic arrays, each array is arranged from a relatively-high frequency antenna element to a relatively-low frequency antenna element. The relationship between the physical lengths from a given antenna element to the subsequent higher-frequency antenna element is approximately 1 to 0.5 to 1 to 0.95. Spacing of the antenna elements are between 0.1 to 0.2 times the length of each antenna element. The transmission lines feeding the arrays have a characteristic impedance of 50-110 ohms and couple to the apex of each array.

Figure 6:
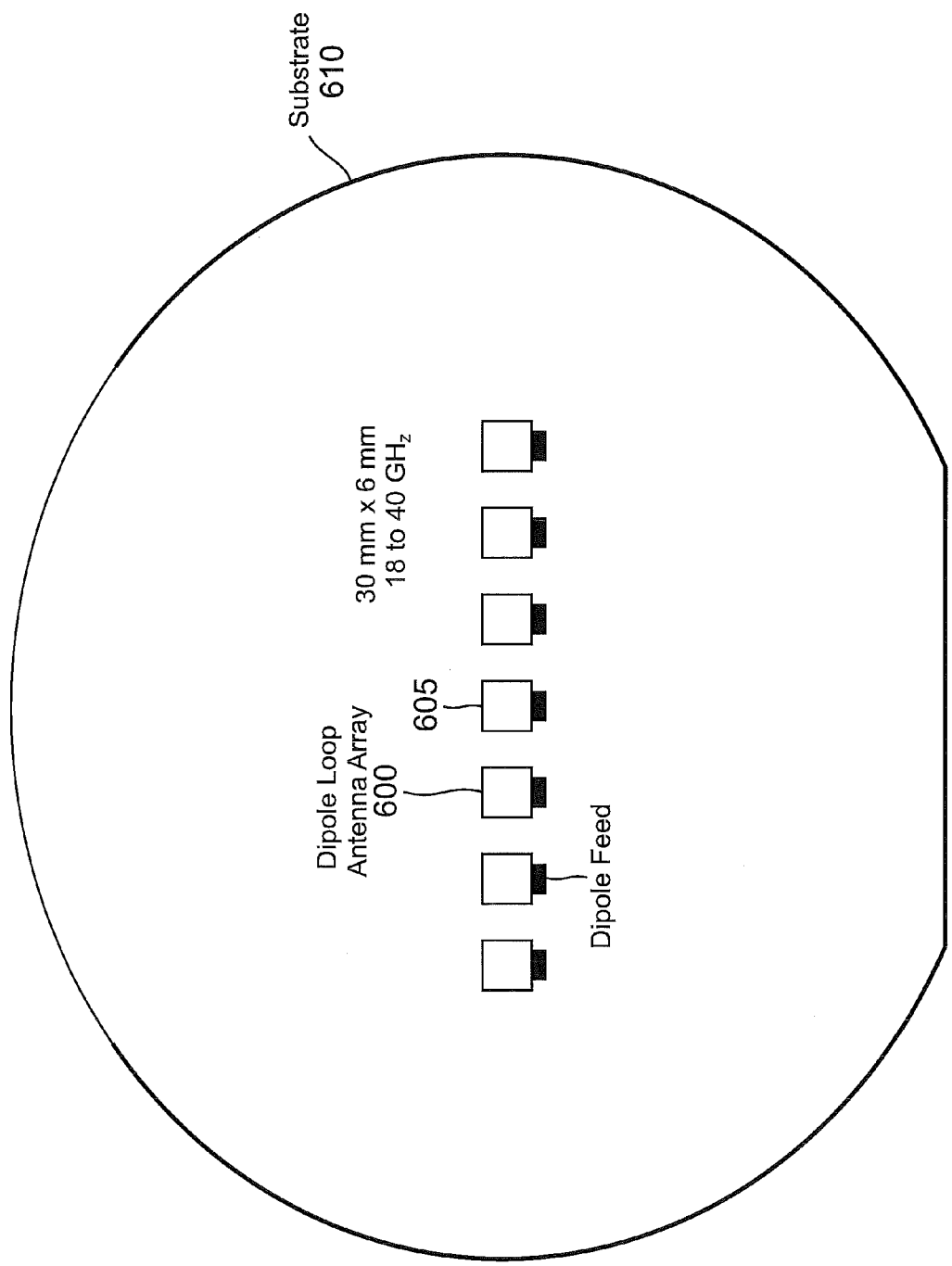
FIG. 6 illustrates an array of multiple dipole loops integrated onto a semiconductor, glass or flexible substrate according to an embodiment of the invention

FIG. 6 is an alternative approach for implementation of an antenna array 600. Array 600 is formed from a linear arrangement of dipole loops 605. Each dipole loop 605 may be formed on a semiconductor substrate 610 as discussed with respect to FIG. 4. In addition, array 600 may also be formed on a glass substrate such as an automobile windshield. An important beamforming function of an antenna array is to scan a 360 degrees azimuth while changing the latitude angle. Using the RF beamforming approach discussed earlier, the phasing of each loop 605 may be varied such that the conical beam angle changes from 0, 10, 20, 30, and 40 degrees linearly for phase variation of 0 to 120 degrees, respectively. The gain for the array of 5 loops changes from 8.16, 10.27, 10.7, 9.95, to 9.83 dBi, respectively.

Figure 7:
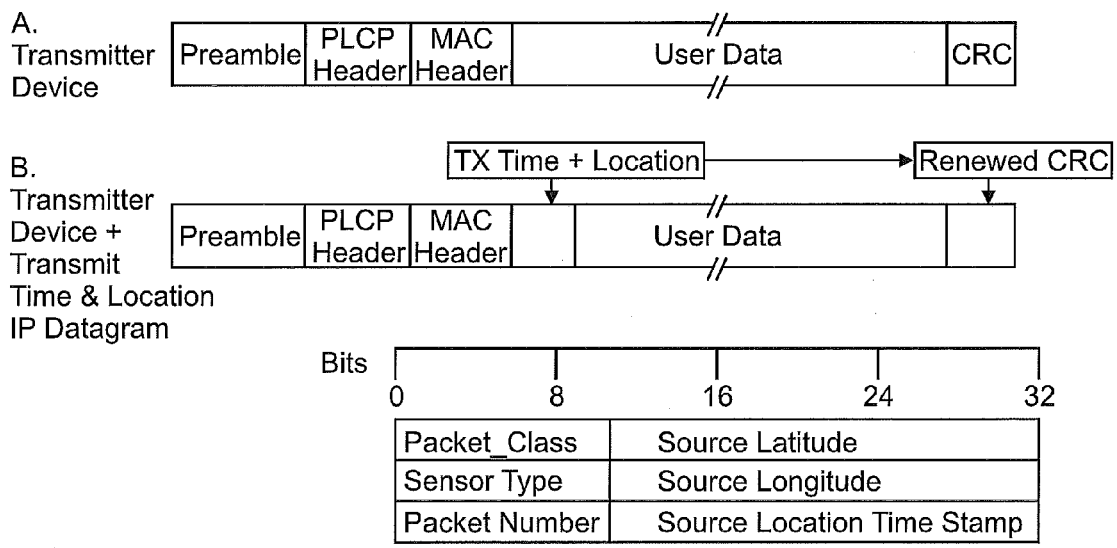
FIG. 7 illustrates an 802.11-based packetization of digitized sensor data with GPS timing and location data according to an embodiment of the invention.

Regardless of how the antenna elements 170 are integrated within integrated antenna circuits 125, RF downlink module 100 may include a coding modulator to perform the packetization of digitized sensor information with GPS timing and range information as described previously. This packetization may be performed in any suitable protocol such as 802.11 or GPRS. FIG. 7 illustrates the packetization of GPS time and coordinates with a digitized sensor signals into for an 802.11-based (WLAN) system. To save bandwidth, all data types are chosen as small as possible with respect to the desired accuracy. An identifier to distinguish between certain packet types is needed. The so-called Packet Class is a 8-bit unsigned integer. Thus, 255 different packet types can be defined, which is sufficient to address many sensor types in a vicinity of a cell or access point.

Each coordinate is a 24-bit unsigned integer coding for a geographical angular coordinate. The conversion from floating point provided by the GPS to a 24-bit unsigned integer as:

$$lati = \left\lfloor \frac{\theta + 90}{180} \cdot (2^{24} - 1) \right\rfloor \quad \forall \; -90 \le \theta \le 90$$

$$longi = \left\lfloor \frac{\theta + 180}{360} \cdot (2^{24} - 1) \right\rfloor \quad \forall \; -180 \le \phi \le 180$$

where θ is the latitude angle and φ is the longitude angle.

Alternatively, integer numbers may be used directly from triangulation schemes of GPS in integer domain. It will be appreciated that the allocated fields in a packet can be larger than the one used as an example here. For example, the digitized sensor information may comprise conventional electronic product code (EPC) as used for RFID application:

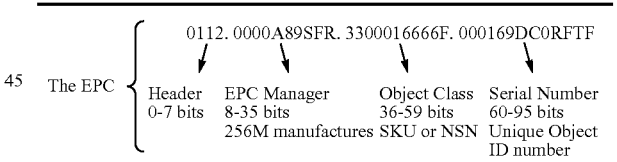

The digitized sensor field must thus be at least 96 bits to accommodate EPC data. Regardless of the format for the digitized sensor information, it is placed into the user data block of the 802.11 packets in addition to the GPS timing and location data.

Repetition of data gathering and logging function may be managed by the controller 190. This management has a direct correlation to the amount of power consumed by RF downlink module 100 and thus may be controlled remotely using an 802.11 protocol intervention at the MAC layer. Such an 802.11 power saving mechanism is based on the fact that an 802.11 Access Point (AP) maintains an updated record of the stations (in this particular case, RF downlink modules 100) that are currently in a power saving mode. The AP may buffer the packets that are addressed to a specific RF downlink module 100 and delivers upon a polling request from the RF downlink module 100. The AP may also periodically transmit Beacon Frames to prompt the RF downlink module 100 to investigate the availability of digitized sensor data that may downloaded.

Figure 8:
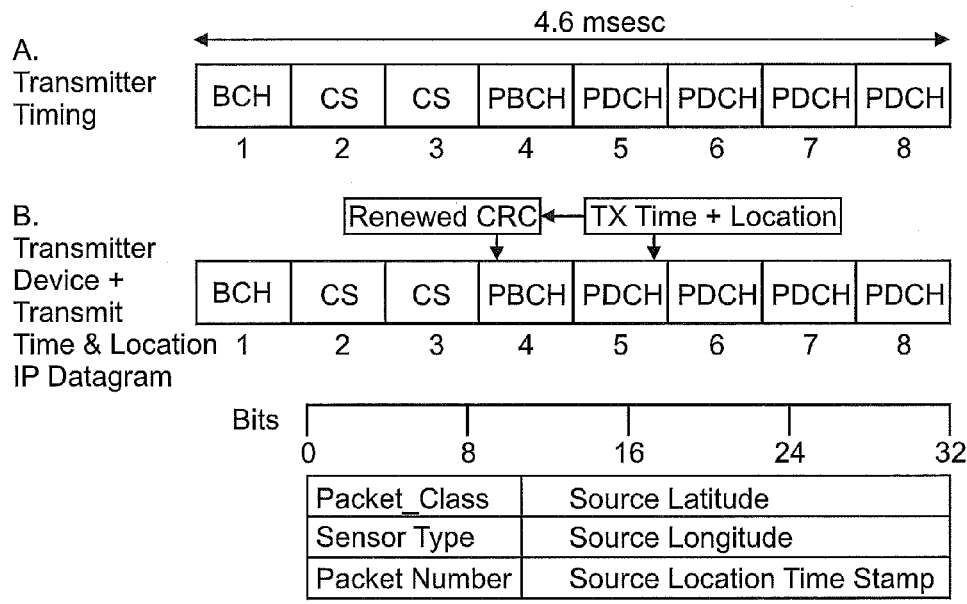
FIG. 8 illustrates a GPRS-based packetization of digitized sensor data with GPS timing and location data according to an embodiment of the invention.

The packetization of digitized sensor data with GPS timing and location data according to the GPRS format is illustrated in FIG. 8. To save bandwidth, all data types are chosen as small as possible with respect to the desired accuracy. An identifier to distinguish between certain packet types is needed. The so-called Packet Class is a 8-bit unsigned integer. Thus, 255 different packet types can be defined, which is sufficient to address many sensor types in a vicinity of a cell or access point. Each coordinate is a 24-bit unsigned integer coding for a geographical angular coordinate.

As known in the arts, GRPS is a packet-based IP connectivity solution supporting a wide range of enterprise and consumer applications. GPRS networks operate as wireless extensions to the Internet such that GPRS provides users Internet access as well as access to their organizations from anywhere. GPRS is essentially the addition of a packet-data infrastructure to GSM. The function of data elements are as follows:

1. The base station controller directs packet data to the Serving GPRS Support Node (SGSN), an element that authenticates and tracks the location of mobile stations.

2. The SGSN performs the types of functions for data that the mobile switching center performs for voice. There is one SGSN for each serving area, and it is often collocated with the Mobile Switching Center (MSC).

3. The SGSN forwards user data to the Gateway GPRS Support Node (GGSN), which is a gateway to external networks. There is typically one GGSN per external network (Internet). The GGSN also manages IP address, assigning IP addresses dynamically to mobile stations for their data sessions. Another important element is the home location register (HLR), which stores users' account information for both voice and data service. In addition, another important factor is that same packet infrastructure can be used to support data services in EDGE and WCDMA networks, simplifying network upgrades. As seen in FIG. 8, GSM uses radio channels of 200 KHz width, divided in time into eight time slots that repeat every 4.6 msec. The network assigns different functions to each time slot, such as broadcast control channel, circuit switch function such as data calls, packet broadcast control channel, and packet data channel. Each data time slot can be used to deliver data rates of about 10 Kbits/s. The network can aggregate up to four of these on the downlink with current devices to deliver users perceived data throughputs of up to 40 Kbit/s. If there are multiple data users active in a cell sector, they share the available data channels.

Figure 9:
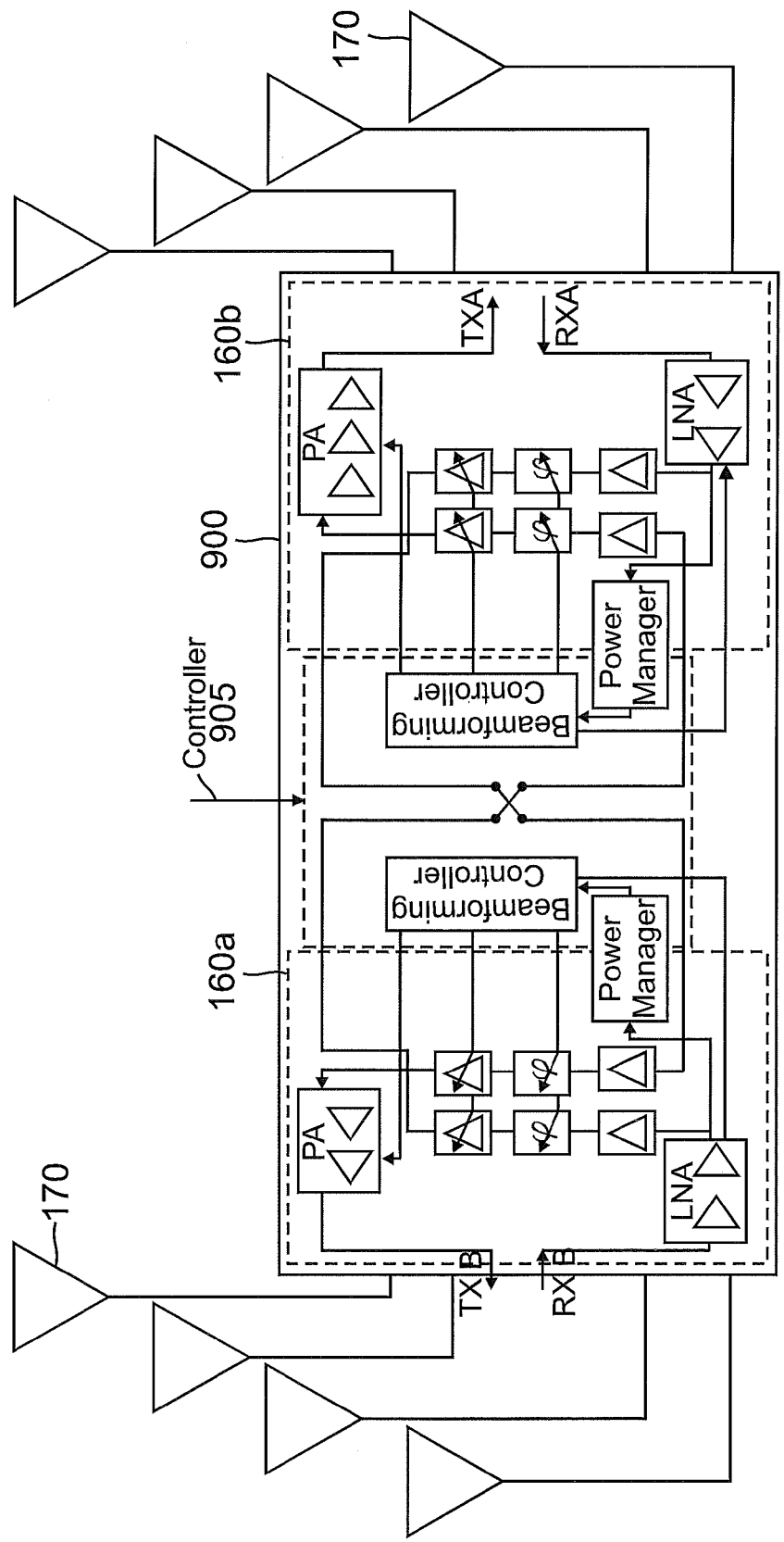
FIG. 9 is a block diagram of a directional RF repeater according to an embodiment of the invention.

Consider the many advantages of the direct downlink module 100 disclosed herein. Adaptive or programmable beamforming capabilities are combined with protocol management techniques to package digitized sensor data into packets that may then be downlinked to appropriate recipients. Moreover, if the sensor signal does not need packetization with GPS timing and location data, a compact router may be formed. For example, turning now to FIG. 9, a directional repeater 900 includes a plurality of antennas 170 as described previously. For illustration clarity, only two RF beamforming interface circuits 160 are shown. It will be appreciated, however, that each receive/transmit antenna 170 is part of an integrated antenna circuit (not shown) as discussed with respect to FIG. 2a. Router 900 includes a controller 906 that may be implemented with, for example, an FPGA or other programmable circuit to control the routing of received signals. In this fashion a RF beamforming circuit 160a may be configured for the appropriate directivity to receive an RF signal that is then transmitted through RF beamforming circuit 160b configured for another directivity. It will be appreciated that directional repeater 900 may be further simplified in that one integrated antenna circuit may be specialized for reception only whereas another integrated antenna circuit may be specialized only for transmission. Regardless of the level of specialization, directional repeater 900 need not demodulate the repeated signal, thereby achieving rapid and efficient repetition.

The above-described embodiments of the present invention are merely meant to be illustrative and not limiting. It will thus be obvious to those skilled in the art that various changes and modifications may be made without departing from this invention in its broader aspects. The appended claims encompass all such changes and modifications as fall within the true spirit and scope of this invention.

I claim:

1. A downlink module, comprising:
   a sensor interface operable to provide digitized sensor signals;
   a GPS receiver operable to provide GPS timing and location signals;
   a digital signal processor and coding modulator for forming baseband packets of the digitized sensor signals and the GPS timing and location signals according to a desired protocol;
   an IF stage for converting the baseband packets into an RF packet signal;
   a beamforming controller; and
   an array of integrated antenna circuits, each integrated antenna circuit operable to phase shift and/or attenuate the RF packet signal according to a beamforming command from the beamforming controller such that a transmitted RF packet signal from the array of integrated antenna circuits is directed into a desired beam direction.

2. The downlink module of claim 1, wherein the downlink module is integrated onto a single semiconductor substrate.

3. The downlink module of claim 1, wherein the desired protocol is an 802.11-based protocol, the baseband packets thereby being 802.11 packets.

4. The downlink module of claim 3, wherein the digital signal processor and coding modulator is configured to integrate the GPS timing and location signals and the digitized sensor information into the user data field of the 802.11 packets.

5. The downlink module of claim 4, wherein the digital signal processor and coding modulator is configured to integrate a classification of the digitized sensor data into the packet class field.

6. The downlink module of claim 4, wherein the digitized sensor information comprises Electronic Product Code (EPC) information.

7. The downlink module of claim 1, wherein the desired protocol is a GPRS-based protocol, the baseband packets thereby being GSM packets.

8. The downlink module of claim 7, wherein the digital signal processor and coding modulator is configured to integrate the GPS timing and location signals and the digitized sensor information into the packet data channel (PDCH) field of the GSM packets.

* * * * *